(12) United States Patent
Wu

(10) Patent No.: US 9,120,523 B2
(45) Date of Patent: Sep. 1, 2015

(54) FOLDABLE FRAME FOR TWO-WHEEL VEHICLE

(71) Applicant: Sze Keung Wu, Hong Kong (HK)

(72) Inventor: Sze Keung Wu, Hong Kong (HK)

(*) Notice: Subject to any disclaimer, the term of this patent is extended or adjusted under 35 U.S.C. 154(b) by 0 days.

(21) Appl. No.: 14/141,474

(22) Filed: Dec. 27, 2013

(65) Prior Publication Data

US 2014/0225348 A1 Aug. 14, 2014

Related U.S. Application Data

(60) Provisional application No. 61/762,340, filed on Feb. 8, 2013.

(51) Int. Cl.
*B62K 15/00* (2006.01)
*B62K 21/18* (2006.01)
*B62K 21/20* (2006.01)

(52) U.S. Cl.
CPC ............. *B62K 15/006* (2013.01); *B62K 15/008* (2013.01); *B62K 21/18* (2013.01); *B62K 21/20* (2013.01)

(58) Field of Classification Search
CPC ................................................. B62K 15/006
USPC ......................................................... 280/278
See application file for complete search history.

(56) References Cited

U.S. PATENT DOCUMENTS

| | | | |
|---|---|---|---|
| 1,326,148 A * | 12/1919 | Hudry | 280/7.15 |
| 3,865,403 A | 2/1975 | Majerus | |
| 5,440,948 A | 8/1995 | Cheng | |
| 6,196,566 B1 | 3/2001 | Zhang | |
| 6,688,625 B1 * | 2/2004 | Schreuder et al. | 280/260 |
| 6,984,194 B2 | 1/2006 | Ma | |
| 7,232,144 B2 | 6/2007 | Colman | |
| 7,614,632 B2 | 11/2009 | Tak-Wei Hon | |
| 2003/0067137 A1 * | 4/2003 | Chen | 280/278 |
| 2005/0001404 A1 * | 1/2005 | Mihelic | 280/278 |
| 2005/0151345 A1 | 7/2005 | Chen | |
| 2006/0163837 A1 * | 7/2006 | Sutherland | 280/284 |
| 2007/0290479 A1 * | 12/2007 | Tong | 280/278 |
| 2010/0148467 A1 * | 6/2010 | Hoerdum et al. | 280/278 |
| 2011/0187078 A1 | 8/2011 | Higgon | |
| 2011/0193319 A1 * | 8/2011 | Durand | 280/491.1 |
| 2012/0060639 A1 | 3/2012 | Huang | |

FOREIGN PATENT DOCUMENTS

| | | | |
|---|---|---|---|
| JP | H10119861 A | 5/1998 | |
| JP | 2000128055 A | 5/2000 | |

OTHER PUBLICATIONS

European Search Report of EP14154385 issued on May 20, 2014.

* cited by examiner

*Primary Examiner* — Tony Winner
(74) *Attorney, Agent, or Firm* — Ella Cheong Hong Kong; Sam T. Yip

(57) ABSTRACT

A foldable frame for bicycle is provided in the present invention. The foldable frame can be folded up in three simple steps because of the application of two releasable locking systems: (1) release a front locking system; (2) release a rear locking system; (3) fold up a pair of rear forks hinge joint with a crossbar towards the front wheel. Other parts such as seat tube and pedal bar which are hinge joint with the crossbar can be folded up towards the crossbar. To reduce weight of the frame, a single-tube suspension system is also employed at the front of the foldable frame. The foldable frame of the present invention is easy to fold, non-bulky, lightweight and affordable to strong force as compared to any conventional foldable bicycles. The present invention can be applied to bicycle or any two-wheel vehicles such as electricity-driven or petroleum-driven motorcycle.

16 Claims, 12 Drawing Sheets

FOLDABLE FRAME FOR TWO-WHEEL VEHICLE

CROSS-REFERENCE TO RELATED APPLICATION

The present application claims priority from US provisional patent application 61/762,340 filed Feb. 8, 2013, and the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a foldable frame for two-wheel vehicle, in particular, a foldable frame for bicycle which is configured to be folded in few simple steps and reduced in weight.

TECHNICAL BACKGROUND

Most of the conventional bicycles are configured to be foldable for easy transportation. However, many of these conventional foldable bicycles require complicated folding system to transform the bicycle from unfolded state to folded state. For example, in U.S. Pat. No. 6,196,566, the foldable bicycle is needed to form three quadrilaterals first in order to be folded up. The folded state of the bicycle in that patent is relatively bulky because only the four bars forming the two triangles of the bicycle frame can be folded up but not the front/rear forks or the handle bars. Some other conventional foldable bicycles may have a folding system at the middle of the crossbar in order to reduce the length of the bicycle into half when it is folded up, for example, in U.S. Pat. No. 3,865,403. However, that kind of folding system at the middle of the crossbar is unable to withstand strong force against the bicycle frame when the bicycle is in use. A quick, easy to fold, non-bulky and lightweight frame which can withstand strong force in a bicycle is therefore desired.

SUMMARY OF THE INVENTION

The first aspect of the present invention relates to a foldable frame for any two-wheel vehicle including bicycle. The foldable frame of the present invention can be folded up in three simple steps because of the application of two releasable locking systems to the foldable frame of the present invention: (1) release a front locking system which is configured to releasably connect the handle bars with the head tube which passes through a ring structure at the front end of the crossbar of the foldable frame; (2) release a rear locking system which is configured to releasably connect the crossbar with a pair of rear forks; (3) fold the pair of rear forks about a hinge joint with the crossbar towards the direction of the front wheel after the rear locking system is released such that the rear forks and the head tube can be held in parallel with each other and almost at a right angle to the crossbar. The seat tube which is hinge joint with the crossbar, and the pedal bar which is also hinge joint with the pair of the rear forks, can be further folded towards the crossbar such that the foldable frame is completely transformed from its unfolded state into folded state.

In order to reduce the weight of the foldable two-wheel vehicle which requires a suspension system, the second aspect of the present invention relates to a single-tube suspension system which is at the front end of a foldable bicycle. The single-tube suspension system of the present invention is incorporated into the head tube of the foldable bicycle of the present invention as mentioned in the first aspect of the present invention. By incorporating the concept of a single-tube suspension system into the present invention, it avoids the bulkiness and relatively large volume of the conventional dual-tube suspension system. The single-tube suspension system of the present invention is made of lightweight material, e.g. stainless steel, lightweight metal alloy and/or plastic. The single-tube suspension system of the present invention includes three cylindrical members with different circumferences and lengths but they are aligned along the same vertical axis centrically. The top end of a first cylindrical member (the longest cylindrical member) has two arc-shaped structures (or notches) at its periphery to serve as a female member for interlocking with a male member in a cavity at the bottom side of the front locking system in order to secure the handle bar on the head tube. A third cylindrical member (the shortest cylindrical member) situated between the first cylindrical member and a second cylindrical member (the second longest cylindrical member) for enhancing the stability during the movement of the first cylindrical member inside the second cylindrical member. The second cylindrical member further includes a suspension spring situated inside the interior space thereof such that when the first cylindrical member is pressed down towards the bottom of the second cylindrical member, the suspension spring can absorb the downward force from the first cylindrical member. The first and second cylindrical members are secured by a pin axle which is inserted through a pair of holes on the cylindrical surface of each of the first and second cylindrical members such that the first cylindrical member can be moved vertically within a confined distance in the interior space of the second cylindrical member. The single-tube suspension system of the present invention greatly reduces the weight and volume of the front part of a bicycle as compared to the conventional non-foldable or foldable bicycle which usually has a dual-tube suspension system.

In the following examples, an example of a foldable bicycle incorporating the foldable frame of the present invention is used for illustration purpose but the application of the foldable frame of the present invention is not limited to bicycle but also any two-wheel vehicle, e.g. electricity-driven or petroleum-driven motorcycle.

DETAILED DESCRIPTION OF THE INVENTION

The present invention is now explained more specifically by referring to the following examples with the aid of the corresponding drawings. These examples are given only for a better understanding of the present invention, and not intended to limit the scope of the invention in any way.

Figure 1:
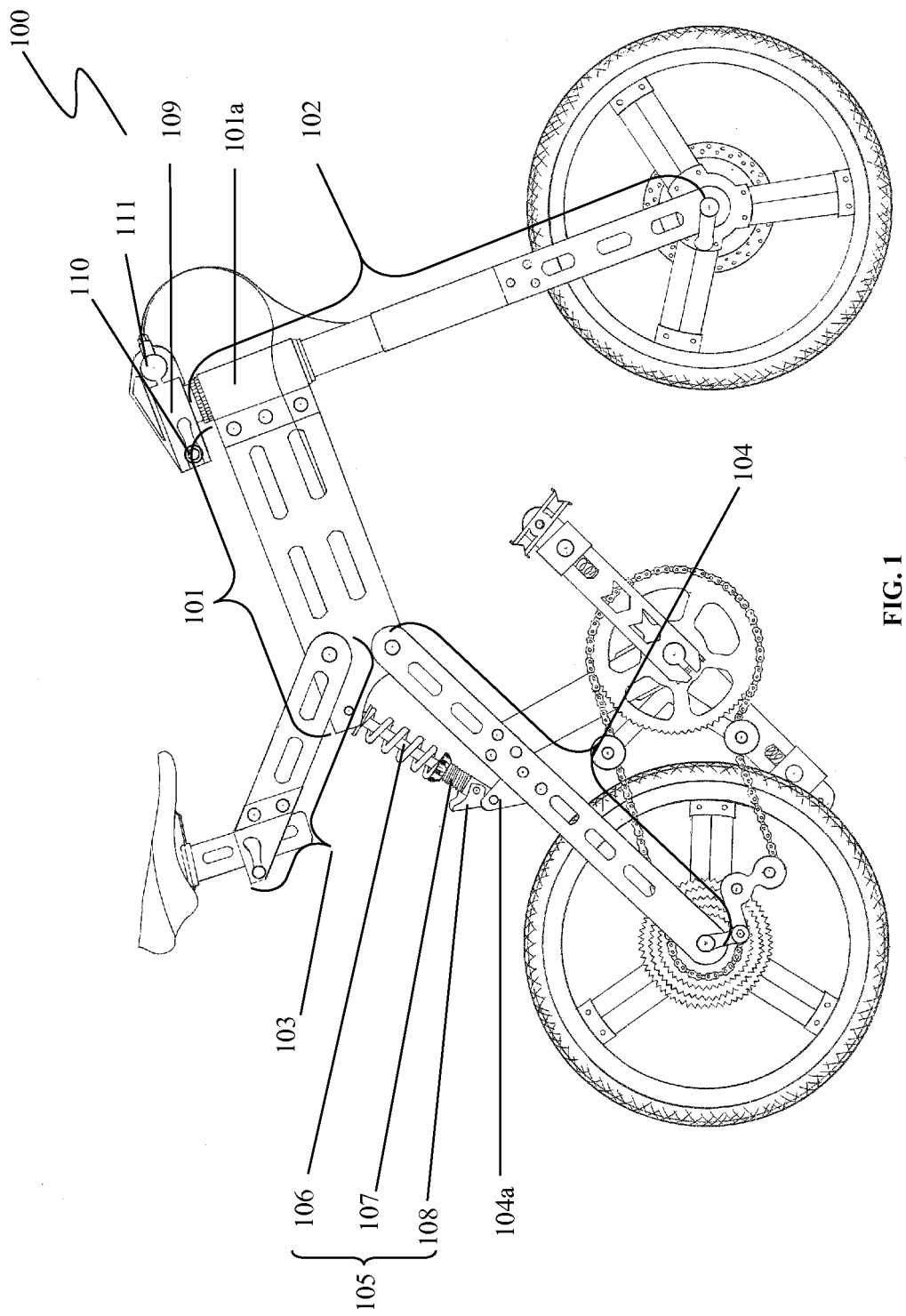
FIG. 1 is a right side view of an embodiment of the foldable bicycle at its unfolded state.
Figure 7:
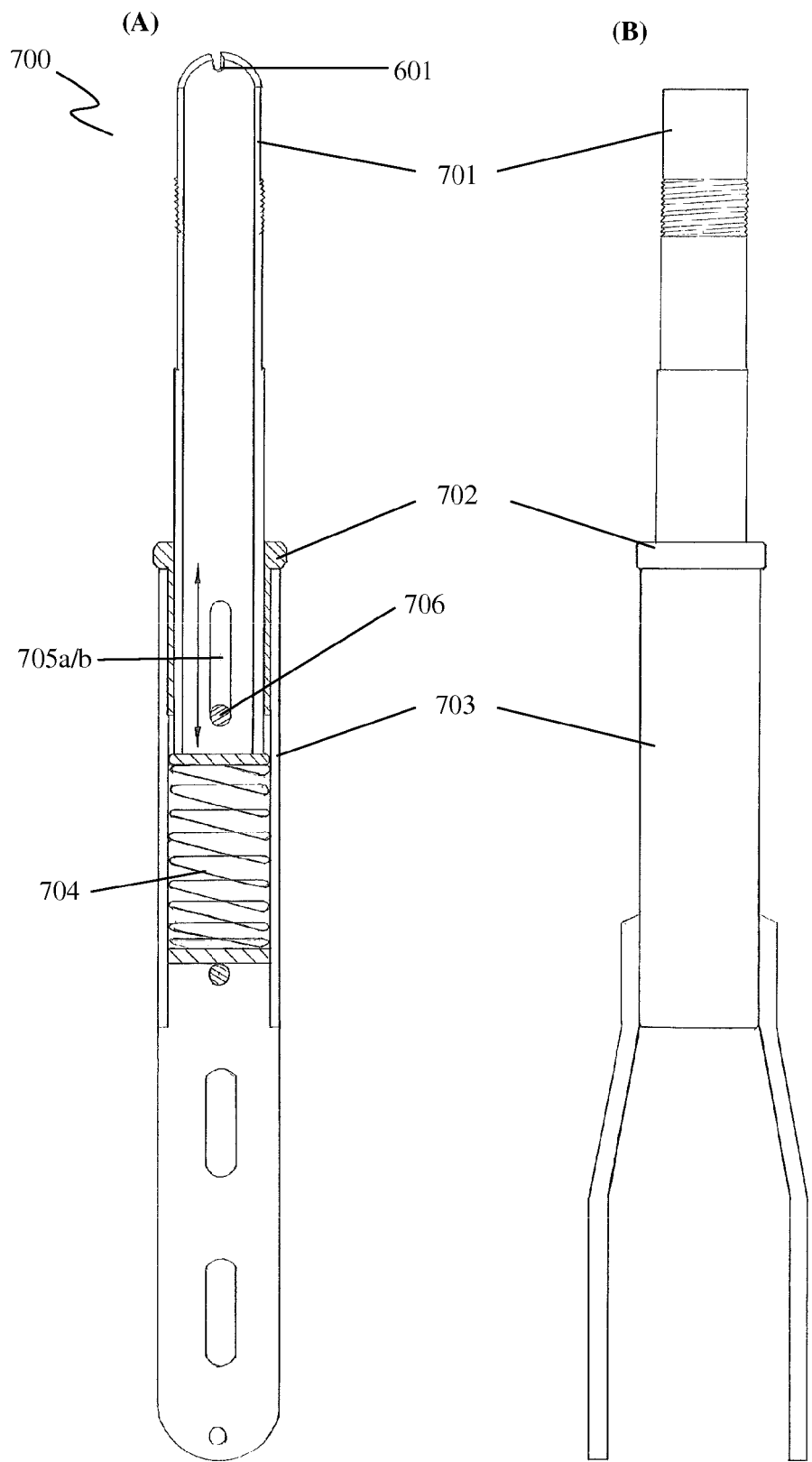
FIG. 7 includes a cross-sectional view (A) and a perspective view (B) of the single-tube suspension system.
Figure 8:
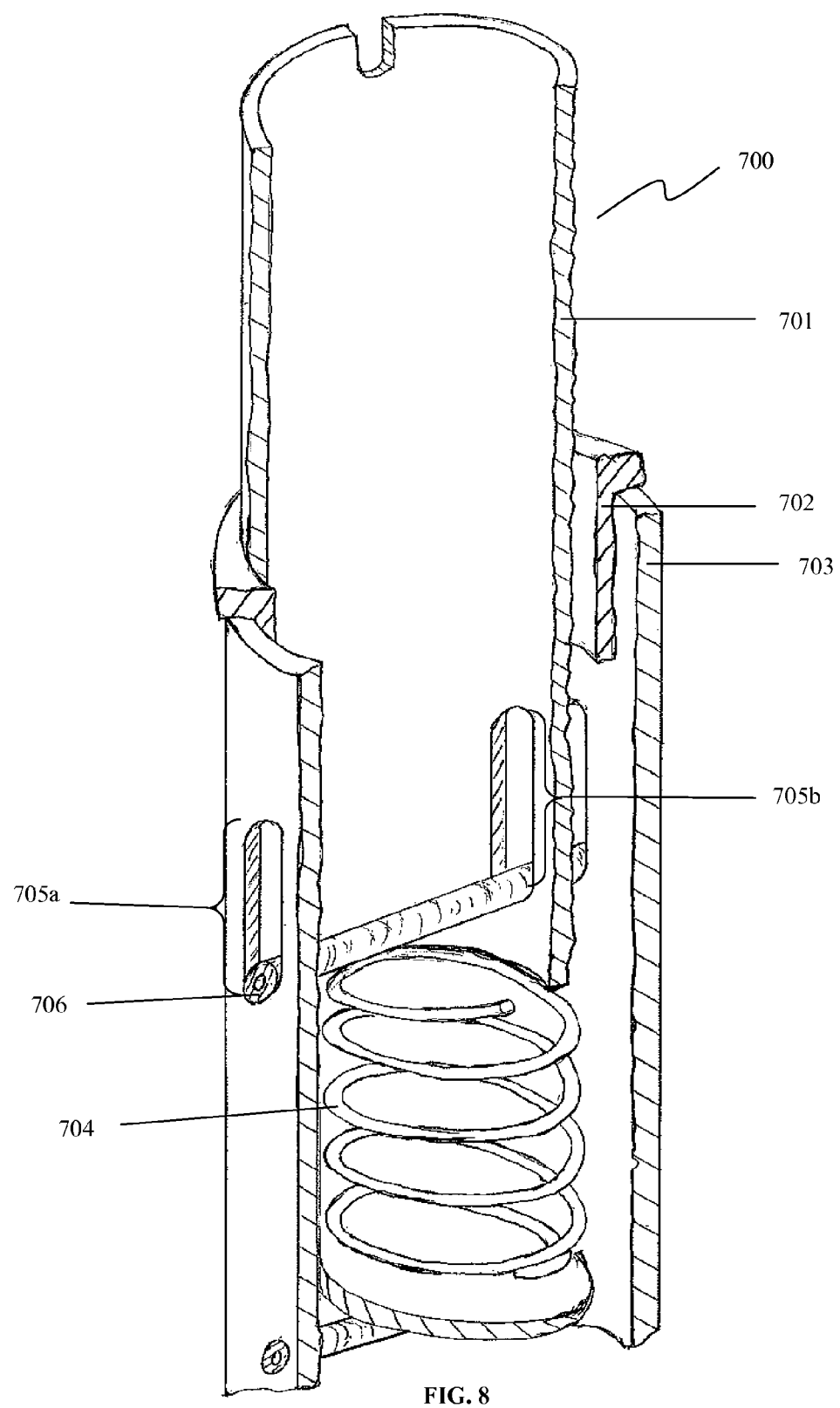
FIG. 8 is a transactional view of the interior of the single-tube suspension system.
Figure 9:
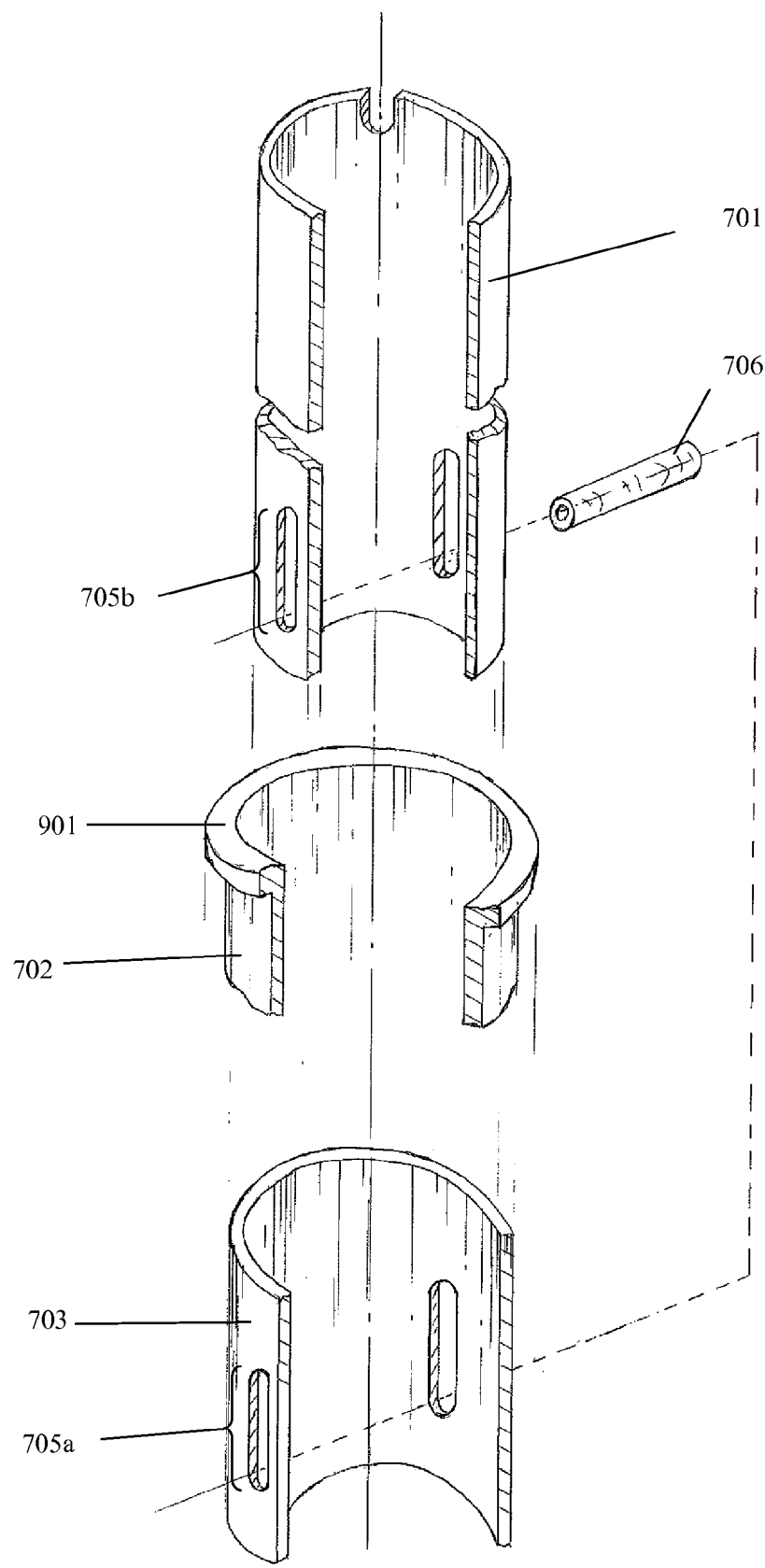
FIG. 9 is an exploded perspective view of the three cylindrical members and a pin axle of the single-tube suspension system.

FIG. 1 is an example of a bicycle incorporated with the foldable frame of the present invention. In this example, the foldable frame 100 includes a crossbar 101. The front end of the crossbar 101 has a ring structure 101a for holding a head tube 102 by passing the head tube 102 through the ring structure 101a while the rear end of the crossbar 101 is hinge joint with a seat tube 103 and a pair of rear forks 104. In between the rear end of the crossbar 101 and the rear forks 104 is further releasably secured by a rear locking system 105. The rear locking system 105 includes a flexible spring-like structure 106, a screw-like member 107 and a safety lock 108. One end of the flexible spring-like structure 106 is connected with the rear end of the crossbar 101 by a hinge joint and another end of the spring-like structure 106 is fixedly connected with one end of the screw-like member 107; another end of the screw-like member 107 is connected with the safety lock 108 which is for securing the rear locking system 105 on the rear forks 104 when the bicycle is in unfolded state 100. The flexible spring-like structure 106 of the rear locking system 105 is designed for absorbing shock from the crossbar 101 and other parts of the foldable bicycle when it is in unfolded state 100. Said another end of the screw-like member 107 is hollow and composed of two arc-shaped structures (notches) as a female member (not shown in FIG. 1) for interlocking with the male member (not shown in FIG. 1) on the rear forks 104 when the safety lock 108 is being clicked up. Detailed illustration of the interlocking relationship between the screw-like member 107, the safety lock 108 and the rear forks 104 is shown in FIGS. 4, 5A and 5B. In addition to the rear locking system 105, there is another locking system at the front end of said crossbar 101, which is situated on top of the head tube 102 which passes through the ring structure 101a at the front end of the crossbar 101. The front locking system 109 is configured to have a cavity at the bottom side thereof (610 as shown in FIG. 6A) which is incorporated with a male member for interlocking with the female member formed by two arc-shaped structures (or notches) (601 as shown in FIG. 6A) at the periphery of the head tube 102. Detailed illustration of the front locking system is shown in FIG. 6A and 6B while the suspension part or specifically called the single-tube suspension system is shown in FIGS. 7-9.

Figure 2:
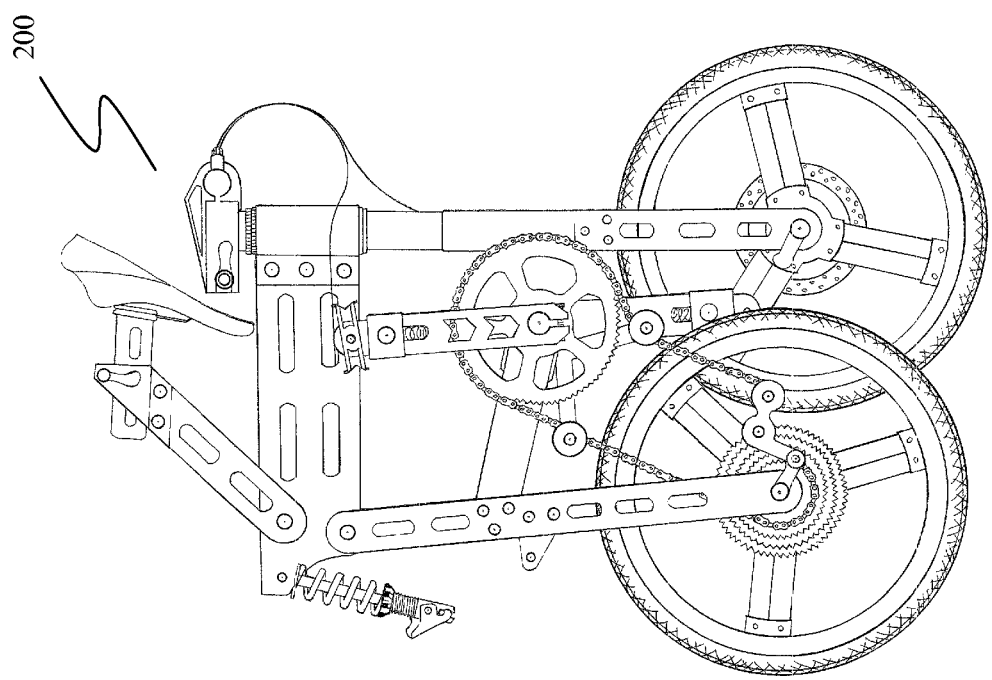
FIG. 2 is a right side view of an embodiment of the foldable bicycle at its folded state.
Figure 3:
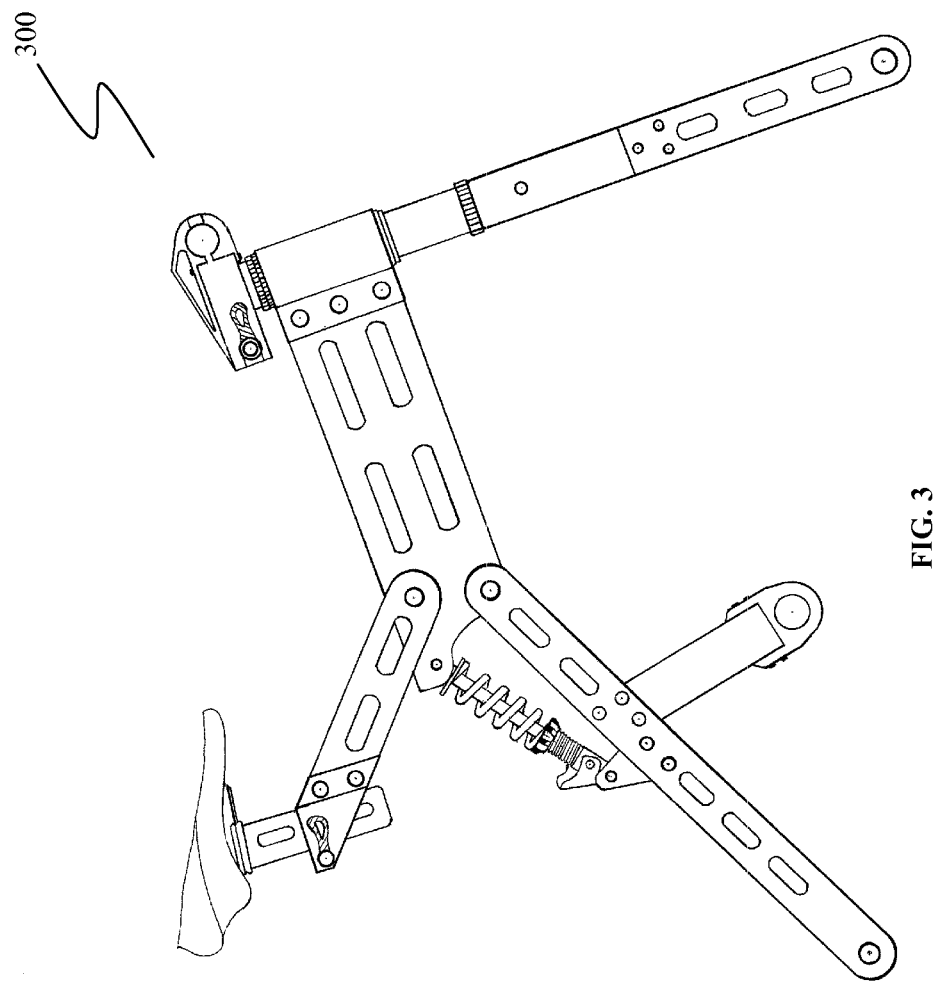
FIG. 3 is a right side view of an exemplary embodiment of the foldable frame at its unfolded state in the absence of the seat, wheels and pedal.

The following is a brief description of how the foldable frame of the present invention is transformed from its unfolded state into folded state using the three simple steps. The first step is to unlock the safety lock 108 of the rear locking system 105 such that the connection between the crossbar 101 and the rear forks 104 by the rear locking system 105 can be released easily. The only connection between the crossbar 101 and the rear forks 104 are two hinge joints but it allows the rear forks 104 to move about the hinge joints towards the crossbar 101 when the bicycle is being folded up. The second step is to unlock the front locking system 109 by releasing a lock 110 at the handle bars 111 such that the top end of the head tube 102 can be plugged out from the cavity (610 as shown in FIG. 6A) of the front locking system 109 in order to release the handle bars 111 from the head tube 102. The first and second steps can be reversed in order. Since the only connection between the crossbar 101 and the pair of rear forks 104 are two separate hinge joints, the rear forks 104 become movable and can be folded about the hinge joints towards the front wheel until the rear forks and the head tube are placed in parallel to each other vertically. In such state, the foldable frame of the present invention is transformed into its folded state. In order to reduce the volume and bulkiness of the foldable bicycle, the seat tube 103 is also hinge joint with the crossbar 101 such that the seat tube 103 is movable towards the crossbar 101. The pedal part is also movable towards the crossbar 101. A schematic example of the foldable bicycle at its fully folded state 200 is shown in FIG. 2. FIG. 3 shows the bicycle frame 300 of the foldable bicycle without the associated parts such as the seat, wheels, handle bars and pedal.

Figure 4A:
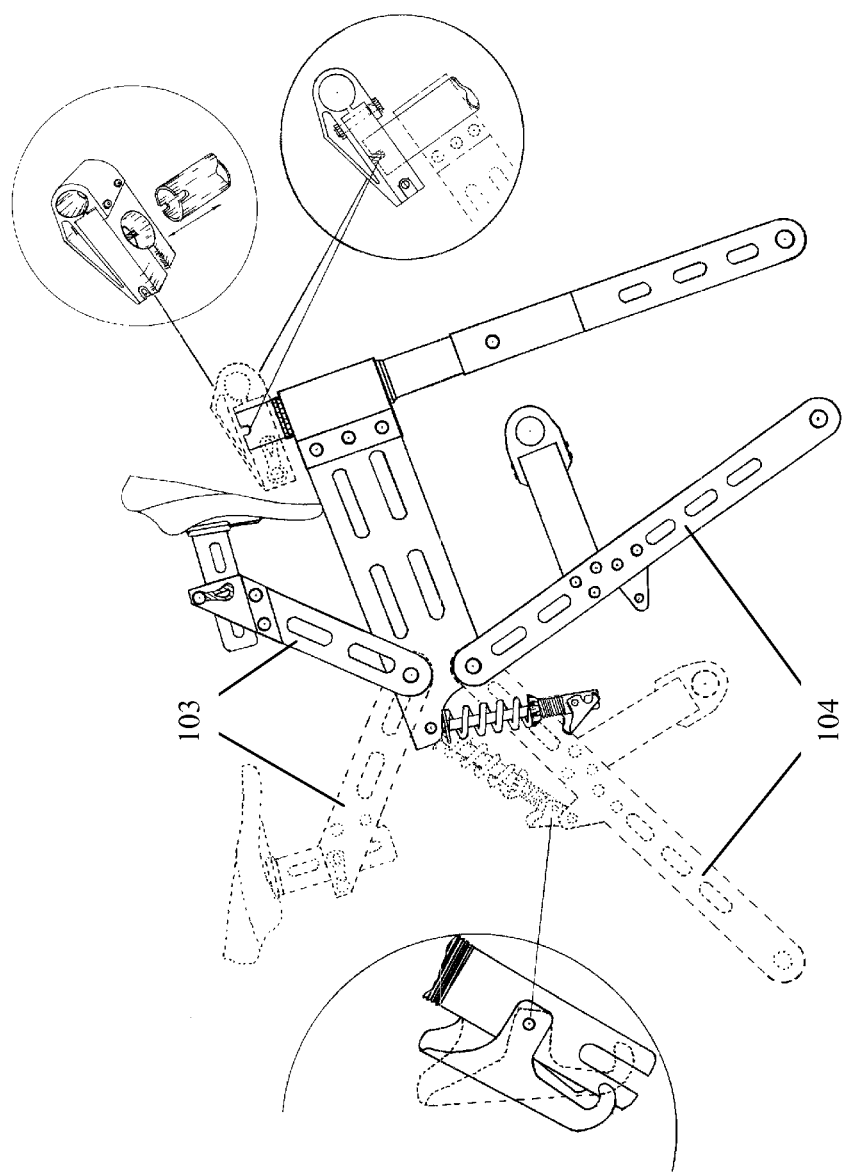
FIG. 4A is a right side view of an exemplary embodiment of the foldable frame at its unfolded state with three reference views showing the position of two locking systems at the front and rear ends of the foldable frame.
Figure 4B:
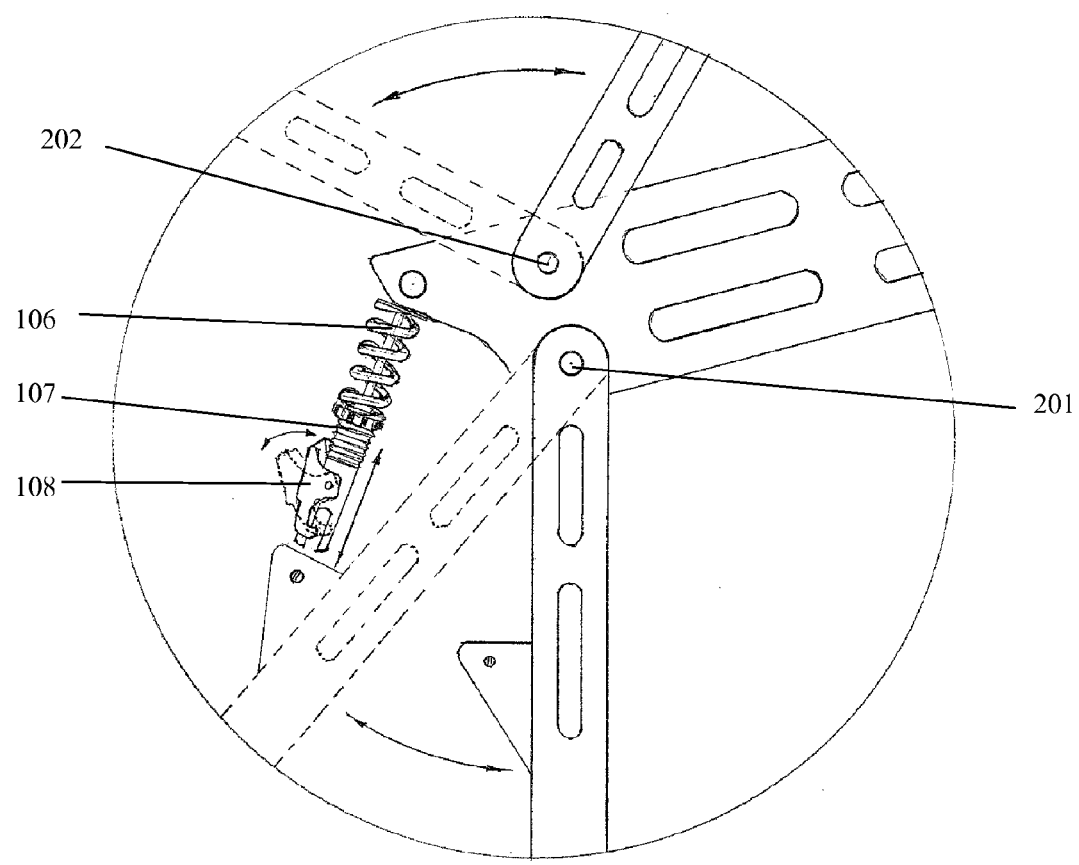
FIG. 4B is a schematic diagram of the relationship between the rear locking system and the operation of the foldable bicycle from the unfolded state to folded state: the dotted and solid outlines represent the corresponding components at the unfolded and folded states of the foldable bicycle, respectively; arrows represent the direction of the movement of different corresponding components.
Figure 5A:
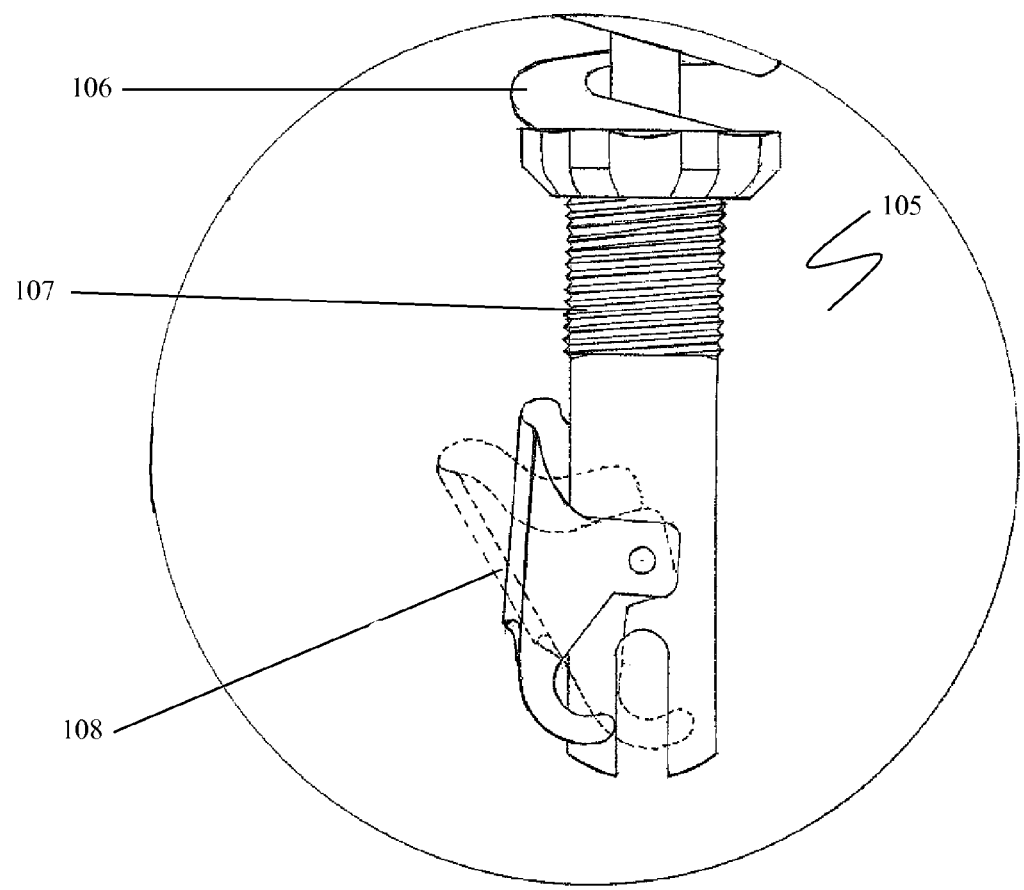
FIG. 5A is an enlarged view of the rear locking system of the present invention: the dotted outline and the solid outline represent the position of the safety lock at the unfolded (locked) and folded (unlocked) states of the foldable bicycle, respectively.
Figure 5B:
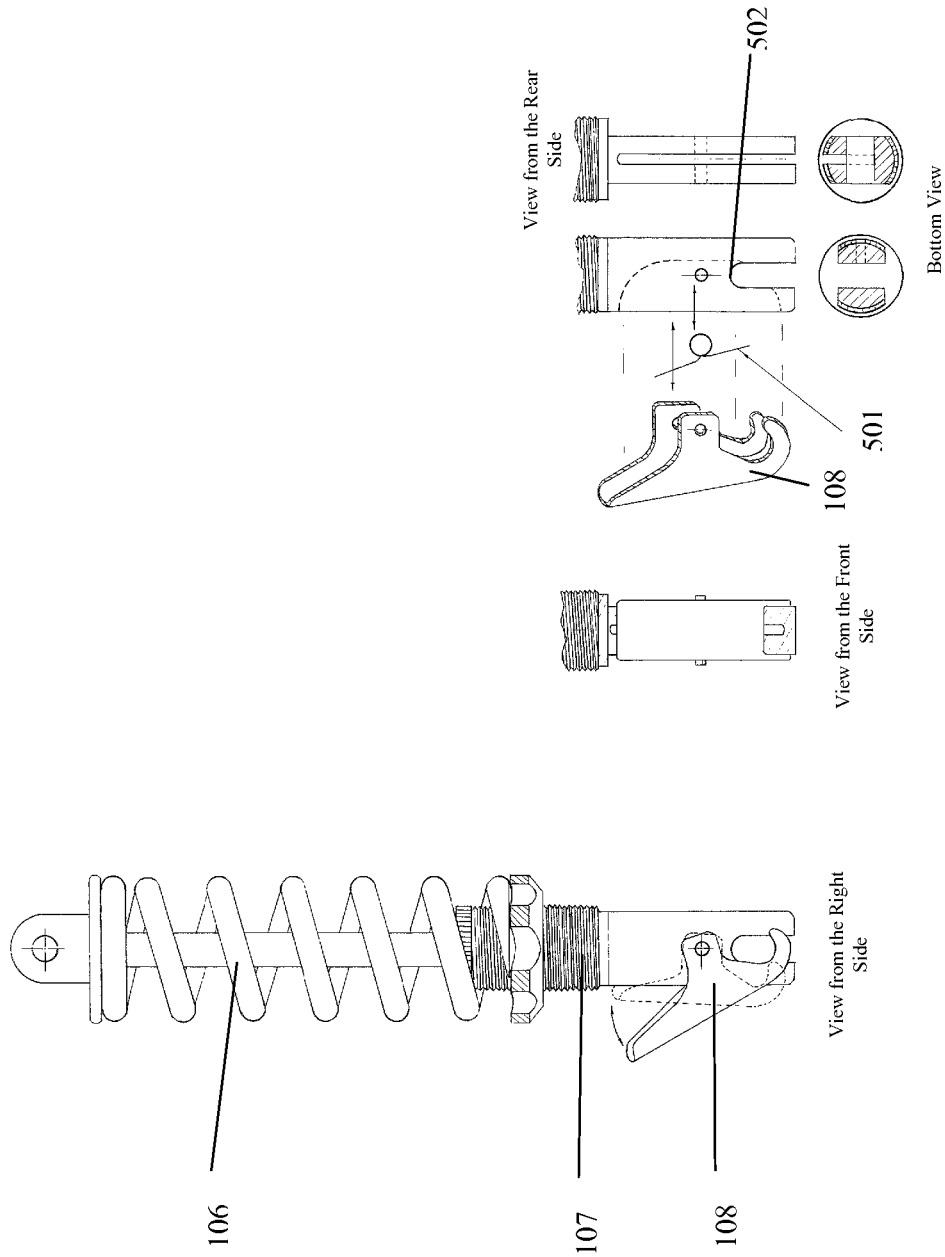
FIG. 5B shows different views of the rear locking system of the present invention: left panel is the view from the right hand side; middle panel is the view from the front side of the foldable frame; right panel shows the safety lock and the two arc-shaped structures (or notches) at the periphery of the bottom end of the screw-like member.

FIG. 4A shows the position of the front and rear locking systems in the foldable frame. The dotted outline represents the original position of the parts at the unfolded state of the foldable frame, which can be detached or moved. For example, the rear forks 104 can be moved about the hinge joints with the crossbar 101 towards the front wheel after the rear locking system is unlocked. The seat tube 103 can also be moved about the hinge joint with the crossbar 101 towards the crossbar. FIG. 4B is an enlarged view of the rear end of the crossbar to further illustrate the working principle of the rear locking system and the path of movement of different movable parts which are hinge joint with the rear end of the crossbar after the rear locking system is released from the rear forks. According to the sequence of the three simple steps as described in the example to transform the foldable bicycle from its unfolded state into folded state, the safety lock 108 should be released first by turning from its its horizontal position (locked) towards its vertical position (unlocked). The screw-like member 107 is subsequently released from an anchoring point 104a on the rear forks such that the releasable connection between the crossbar 101 and the rear forks through the rear locking system is released. The rear forks 104 are then moved pivotally about the hinge joint 201 to a position at about a right angle to the crossbar 101. The seat tube 103 is optionally moved pivotally about the hinge joint 202 to a position at about a right angle to the crossbar 101 in order to further reduce the volume and bulkiness of the foldable bicycle when it is in folded state. FIG. 5A is the enlarged view of the rear locking system. Solid outline represents the safety lock 108 at its unlocked position which is held in an upright position which is almost parallel to the screw-like member 107; whereas the dotted outline represents the safety lock 108 at its locked position which forms an acute angle with the screw-like member 107. FIG. 5B shows different views of the rear locking system 105, especially the screw-like member 107 and the safety lock 108. In the right panel, the safety lock 108 is shown to include a spring 501 for loosening or tightening the safety lock 108. Also, two arc-shaped structures (or notches) 502 are also applied to the rear locking system 105 to interlock with a male member incorporated into the corresponding connection point at the rear forks.

Figure 6:
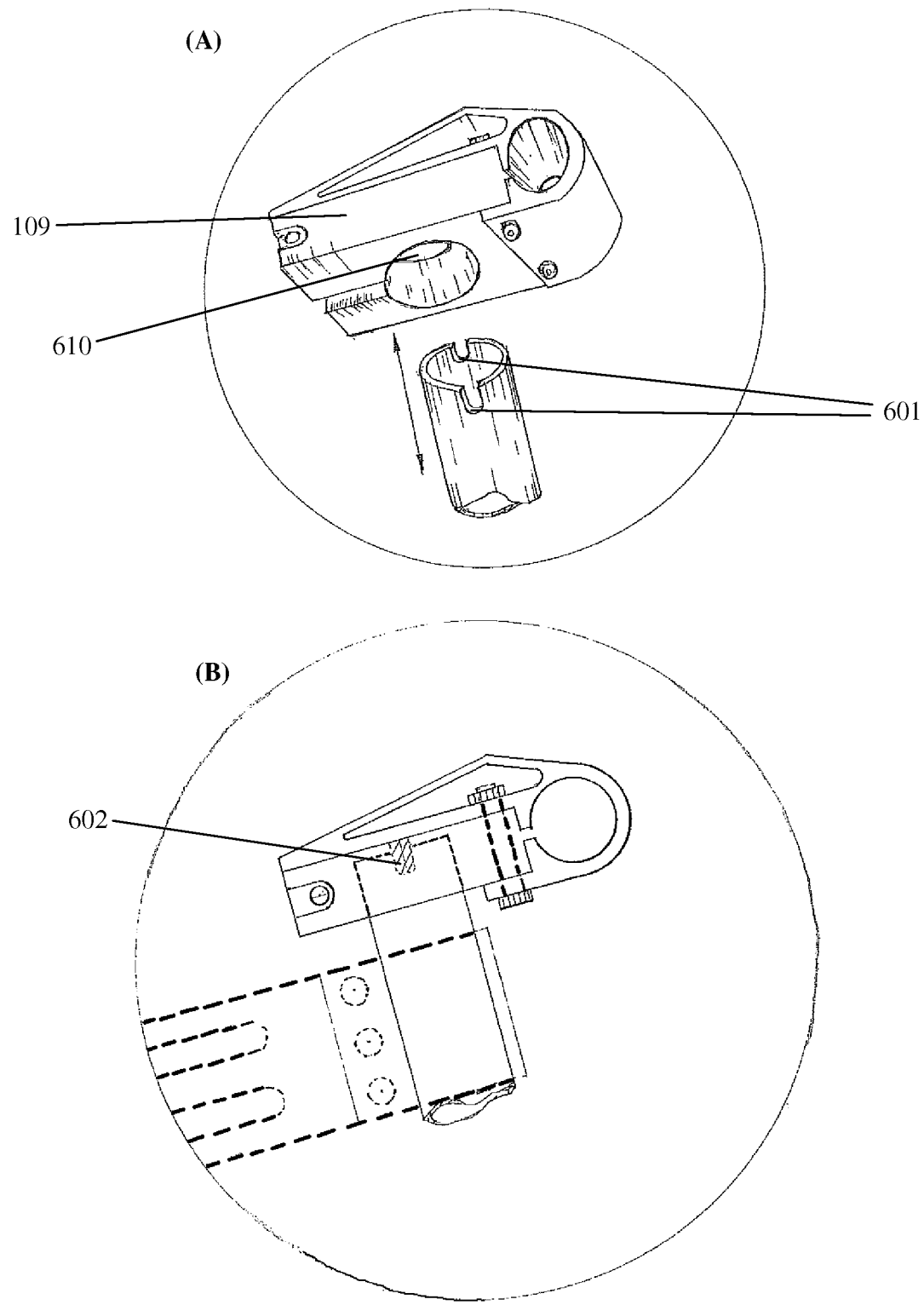
FIG. 6 includes a perspective view (A) and a side view (B) of the front locking system.

FIG. 6 shows how the suspension system inside the head tube is detached from the front locking system. In FIG. 6A, the front locking system includes a cavity 610 incorporated with a male member 602 for interlocking with the top end of the suspension system where there is a pair of arc-shaped structures (notches) 601 acting as a female member to fit into the male member in the cavity 610 at the bottom side of the front locking system. FIG. 6B is the side view (right side) of the front locking system 109 where the dotted outline represents the top end of the head tube 102 plugged inside the cavity 610 of the front locking system 109 when the female and male members are interlocked together.

Figure 10:
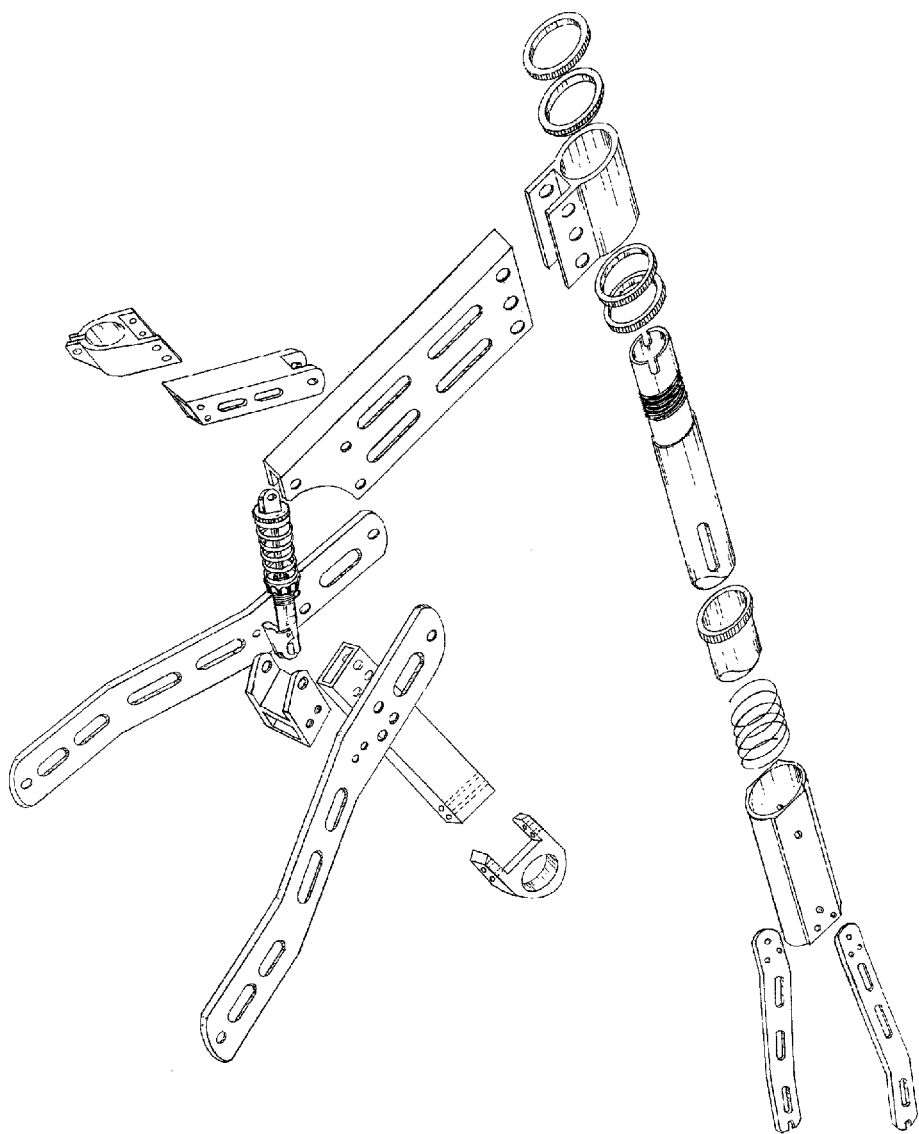
FIG. 10 is an exploded perspective view of the foldable frame (without the front locking system, handle bars, saddle, and pedal).

FIGS. 7-9 are different views of the suspension system of the present invention. To reduce the weight of the frame, the suspension system employs a single-tube suspension system 700 mainly composed of three cylindrical members, a suspension spring and a pin axle. In FIG. 7, a first cylindrical member (the longest cylindrical member) 701 is configured to interact with a second and third cylindrical members (703, 702). The suspension spring 704 is situated at the bottom in the interior space of the second cylindrical member 703. FIG. 8 shows that each of the first and second cylindrical members (701, 703) is configured to have two pairs of holes (705a, 705b) at two opposite sides along the cylindrical wall of the cylindrical member. A pin axle 706 is inserted through the two pairs of holes (705a, 705b) such that the first and second cylindrical members (701, 703) are secured with each other while the first cylindrical member 701 is allowed to have a vertical movement within a confined distance corresponding to the vertical height of the holes (705a, 705b). FIG. 9 shows that the third cylindrical member 702 has a peripheral ring 901 surrounding the top open end thereof. The third cylindrical member 702 serves to fill up the space between the first and the third cylindrical members (701, 703) in order to enhance the stability during the vertical movement of the first cylindrical member 701 onto the suspension spring 704 inside the second cylindrical member 703. In an exemplary embodiment, the third cylindrical member 702 is made of rubber for the purpose of providing elasticity when the first cylindrical member 701 moves vertically inside the . FIG. 10 shows the main components composing the foldable frame of the present invention. It is noteworthy that every component in the present foldable frame is non-welded, and the connection from one component to the other is either by hinge joint or other mechanisms such as the locking system as described in the present invention.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

What is claimed is:

1. A light-weight foldable frame for bicycle, said foldable frame comprising a crossbar (101), a head tube (102), a seat tube (103), a pair of rear forks (104), handle bars (111), and a pair of front and rear locking systems (109, 105); a front end of said crossbar (101) being configured to be fixedly connected with said head tube (102) and releasably connected with said handle bars (111) by said front locking system (109); rear end of said crossbar (101) being configured to be releasably connected with said rear forks (104) by said rear locking system (105); the rear end of said crossbar (101) being independently connected with said seat tube (103) and said rear forks (104) by two separate hinge joints (202, 201); said rear forks (104) being pivotally movable about the hinge joint (201) with said crossbar (101) when a screw-like member (107) of said rear locking system (105) is released from an anchoring point (104a) on said rear forks (104); the foldable frame being transformed from an unfolded state to a folded state when said front locking system and rear locking system are both released wherein said head tube comprises a single-tube suspension system (700) being incorporated into the interior of said head tube (102) for reducing weight of said foldable bicycle, and wherein top end of said single-tube suspension system (700) is configured to have a pair of arc-shaped structures (601) as a female member to interlock with a male member (602) in a cavity (610) at the bottom of said front locking system (109).

2. The foldable frame of claim 1, wherein said rear locking system (105) further comprises a spring-like structure (106) and a safety lock (108), and wherein one end of said spring-like structure (106) is hinge joint with the rear end of said crossbar (101) while another end of said spring-like structure (106) is fixedly connected with one end of said screw-like member (107); another end of said screw-like member (107) is releasably connected with the anchoring point (104a) on said rear forks (104) when said safety lock (108) is held in a position away from said screw-like member (107); said screw-like member (107) becomes releasable from said anchoring point (104a) on said rear forks (104) when said safety lock (108) is pushed towards said screw-like member (107) until said safety lock (108) is held in an upright position almost parallel to said screw-like member (107) in order to release the rear locking system (105).

3. The foldable frame of claim 1 further comprising front wheel being either fixedly connected with or removably attached to said head tube.

4. The foldable frame of claim 1 further comprising rear wheel and pedal part being either fixedly connected with or removably attached to said rear forks, and said pedal part being movable towards the bottom of said crossbar when the foldable frame is to be in folded state.

5. The foldable frame of claim 1, wherein said single-tube suspension system (700) comprises a first, second and third cylindrical members (701, 703, 702), and a suspension spring (704); said first, second and third cylindrical members (701, 703, 702) being aligned vertically and concentrically; said third cylindrical member (702) being positioned between said first cylindrical member (701) and said second cylindrical member (703) and configured for enhancing the stability during the movement of the first cylindrical member (701) inside the second cylindrical member (703); said suspension spring (704) being situated inside an interior space of said second cylindrical member (703) such that when said first cylindrical member (701) is pressed down towards the bottom of said second cylindrical member (703), the suspension spring (704) is capable of absorbing the downward force from said first cylindrical member (701).

6. The foldable frame of claim 5, wherein each of said first and second cylindrical members (701, 703) has a pair of holes (705a, 705b) in opposite positions on the cylindrical wall of each of said first and second cylindrical members for inserting a pin axle (706) through said pair of holes (705a, 705b) such that the first cylindrical member (701) is movable vertically within a confined distance in the interior space of the second cylindrical member (703).

7. The foldable frame of claim 5, wherein said third cylindrical member (702) has a peripheral ring (901) surrounding the top open end thereof.

8. The foldable frame of claim 1, wherein said seat tube is associated with a foldable seat being movable towards the front locking system when the foldable frame is to be in folded state.

9. A light-weight foldable frame for bicycle, said foldable frame comprising a crossbar (101), a head tube (102), a seat tube (103), a pair of rear forks (104), handle bars (111), and a pair of front and rear locking systems (109, 105); a front end of said crossbar (101) being configured to be fixedly connected with said head tube (102) and releasably connected with said handle bars (111) by said front locking system (109); rear end of said crossbar (101) being configured to be releasably connected with said rear forks (104) by said rear locking system (105); the rear end of said crossbar (101) being independently connected with said seat tube (103) and said rear forks (104) by two separate hinge joints (202, 201); said rear forks (104) being pivotally movable about the hinge joint (201) with said crossbar (101) when a screw-like member (107) of said rear locking system (105) is released from an anchoring point (104a) on said rear forks (104); the foldable frame being transformed from an unfolded state to a folded state when said front locking system and rear locking system are both released, wherein said rear locking system (105) further comprises a spring-like structure (106) and a safety lock (108), and wherein one end of said spring-like structure (106) is hinge joint with the rear end of said crossbar (101) while another end of said spring-like structure (106) is fixedly connected with one end of said screw-like member (107); another end of said screw-like member (107) is releasably connected with the anchoring point (104a) on said rear forks (104) when said safety lock (108) is held in a position away from said screw-like member (107); said screw-like member (107) becomes releasable from said anchoring point (104a) on said rear forks (104) when said safety lock (108) is pushed towards said screw-like member (107) until said safety lock (108) is held in an upright position almost parallel to said screw-like member (107) in order to release the rear locking system (105).

10. The foldable frame of claim 9 further comprising front wheel being either fixedly connected with or removably attached to said head tube.

11. The foldable frame of claim 9 further comprising rear wheel and pedal part being either fixedly connected with or removably attached to said rear forks, and said pedal part being movable towards the bottom of said crossbar when the foldable frame is to be in folded state.

12. The foldable frame of claim 9, wherein said head tube comprises a single-tube suspension system (700) being incorporated into the interior of said head tube (102) for reducing weight of said foldable bicycle, and wherein top end of said single-tube suspension system (700) is configured to have a pair of arc-shaped structures (601) as a female member to interlock with a male member (602) in a cavity (610) at the bottom of said front locking system (109).

13. The foldable frame of claim 12, wherein said single-tube suspension system (700) comprises a first, second and third cylindrical members (701, 703, 702), and a suspension spring (704); said first, second and third cylindrical members (701, 703, 702) being aligned vertically and concentrically; said third cylindrical member (702) being positioned between said first cylindrical member (701) and said second cylindrical member (703) and configured for enhancing the stability during the movement of the first cylindrical member (701) inside the second cylindrical member (703); said suspension spring (704) being situated inside an interior space of said second cylindrical member (703) such that when said first cylindrical member (701) is pressed down towards the bottom of said second cylindrical member (703), the suspension spring (704) is capable of absorbing the downward force from said first cylindrical member (701).

14. The foldable frame of claim 13, wherein each of said first and second cylindrical members (701, 703) has a pair of holes (705a, 705b) in opposite positions on the cylindrical wall of each of said first and second cylindrical members for inserting a pin axle (706) through said pair of holes (705a, 705b) such that the first cylindrical member (701) is movable vertically within a confined distance in the interior space of the second cylindrical member (703).

15. The foldable frame of claim 13, wherein said third cylindrical member (702) has a peripheral ring (901) surrounding the top open end thereof.

16. The foldable frame of claim 9, wherein said seat tube is associated with a foldable seat being movable towards the front locking system when the foldable frame is to be in folded state.

\* \* \* \* \*